(12) United States Patent
Depondt

(10) Patent No.: US 9,302,652 B2
(45) Date of Patent: Apr. 5, 2016

(54) WIPER DEVICE

(75) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 40 days.

(21) Appl. No.: 13/994,125

(22) PCT Filed: Nov. 8, 2011

(86) PCT No.: PCT/EP2011/069589
§ 371 (c)(1),
(2), (4) Date: Aug. 16, 2013

(87) PCT Pub. No.: WO2012/079849
PCT Pub. Date: Jun. 21, 2012

(65) Prior Publication Data
US 2013/0333146 A1 Dec. 19, 2013

(30) Foreign Application Priority Data
Dec. 13, 2010 (DE) .......................... 10 2010 062 928

(51) Int. Cl.
*B60S 1/40* (2006.01)
*B60S 1/38* (2006.01)

(52) U.S. Cl.
CPC ................. *B60S 1/40* (2013.01); *B60S 1/3863* (2013.01); *B60S 1/4048* (2013.01); *B60S 1/4087* (2013.01); *B60S 2001/4051* (2013.01); *B60S 2001/4058* (2013.01)

(58) Field of Classification Search
CPC ........ B60S 1/40; B60S 1/3849; B60S 1/4038; B60S 1/4045; B60S 1/4048; B60S 2001/4035; B60S 2001/4061; B60S 2001/4058

USPC .............................. 15/250.32, 250.43, 250.44
See application file for complete search history.

(56) References Cited

U.S. PATENT DOCUMENTS

| | | | | | |
|---|---|---|---|---|---|
| 2,206,343 | A | * | 7/1940 | Zaiger ........................ | 15/250.32 |
| 2,974,341 | A | * | 3/1961 | Hart ............................ | 15/250.32 |
| 2,977,141 | A | * | 3/1961 | Ryck ............................. | 403/189 |
| 5,920,950 | A | * | 7/1999 | Young et al. ............... | 15/250.32 |
| 6,978,511 | B2 | * | 12/2005 | Poton ......................... | 15/250.32 |
| 2006/0059647 | A1 | * | 3/2006 | Ostrowski .................. | 15/250.32 |
| 2010/0005609 | A1 | * | 1/2010 | Kim ....................... | B60S 1/387 |
| | | | | | 15/250.32 |
| 2010/0205763 | A1 | | 8/2010 | Ku | |

FOREIGN PATENT DOCUMENTS

| | | |
|---|---|---|
| CN | 101624043 | 1/2010 |
| DE | 102009002764 | 11/2010 |

(Continued)

OTHER PUBLICATIONS

International Search Report for Application No. PCT/EP2011/069589 dated Feb. 10, 2012 (3 pages).

*Primary Examiner* — Gary Graham
(74) *Attorney, Agent, or Firm* — Michael Best & Friedrich LLP

(57) ABSTRACT

The invention is based on a wiper device for a motor vehicle window, with a wiper arm adapter unit (10a 10j) and a wiper blade adapter unit (12a 12j), which, in a fitted state, form a form-fitting connection. It is proposed that the wiper device has at least one movably mounted latching means (56a 56j) for restricting the wiper arm adapter unit (10a 10j) in the freedom of movement thereof, in the fitted state, at least substantially in a vertical direction (44a 44j) of the wiper blade adapter unit (12a 12j).

9 Claims, 11 Drawing Sheets

(56) References Cited

FOREIGN PATENT DOCUMENTS

| | | |
|---|---|---|
| EP | 1479576 | 11/2004 |
| WO | 2004098962 | 11/2004 |
| WO | WO2007/122568 A2 * | 1/2007 |
| WO | WO2008/122453 A1 * | 10/2008 |
| WO | 2009155230 | 12/2009 |

* cited by examiner

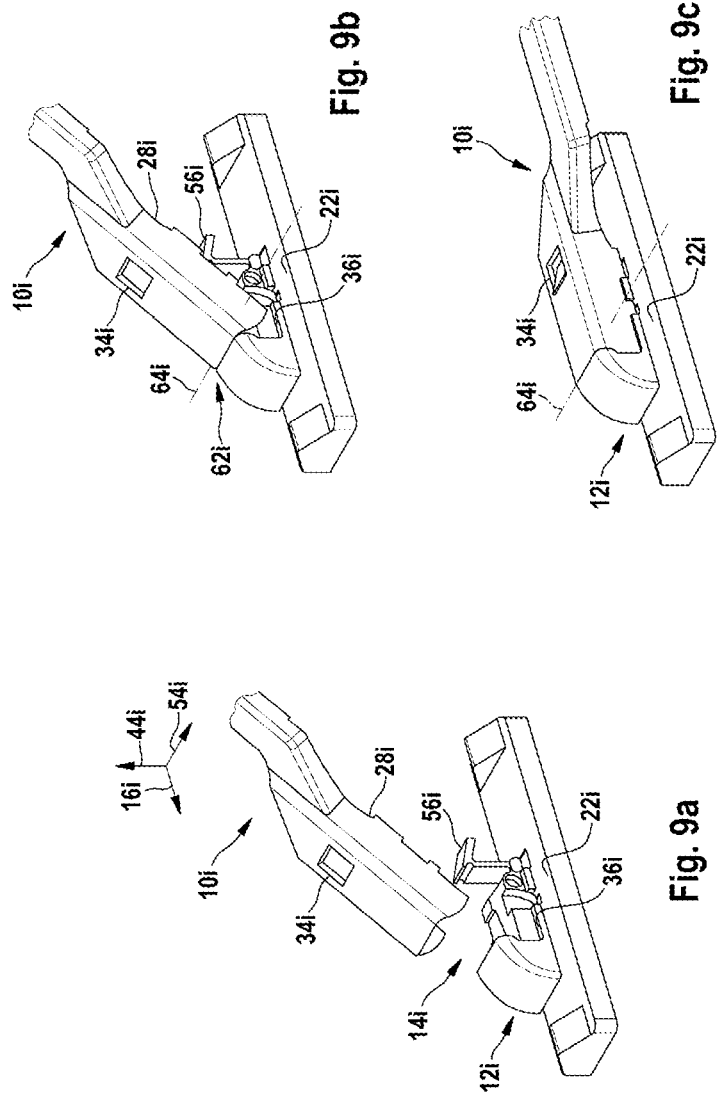

WIPER DEVICE

BACKGROUND OF THE INVENTION

The invention proceeds from a wiper device.

A wiper device for a motor-vehicle window, having a wiper-arm adapter unit and a wiper-blade adapter unit which, in an assembled state, establish a form fit is already known.

SUMMARY OF THE INVENTION

The invention proceeds from a wiper device for a motor-vehicle window, having a wiper-arm adapter unit and a wiper-blade adapter unit, which, in an assembled state, establish a form fit.

It is proposed that the wiper device has at least one movably mounted latching means which is provided so that, in the assembled state, it restricts the freedom of movement of the wiper-arm adapter unit at least essentially in a vertical direction of the wiper-blade adapter unit, as a result of which the wiper device can be assembled particularly straightforwardly. A "wiper-arm adapter unit" in this context is to be understood as meaning an adapter unit which has a region of contact with a wiper-arm component and is connected in captive fashion to the wiper-arm component and is provided so that it establishes a coupling region of the wiper-arm component for coupling to and/or contact with the wiper-blade adapter unit. A "wiper-blade adapter unit" in this context is to be understood as meaning, in particular, an adapter unit which has a region of contact with a wiper-blade component and is connected in captive fashion to the wiper-blade component and is provided so that it establishes the coupling region of the wiper-blade component for coupling to and/or contact with the wiper-arm adapter unit. The wiper-blade adapter unit preferably has a basic body, which establishes a coupling surface for coupling to and/or contact with the wiper-arm adapter unit. An "assembled state" in this context is to be understood as meaning, in particular, a state in which the wiper-blade adapter unit and the wiper-arm adapter unit are coupled to one another. A "latching means" in this context is to be understood as meaning, in particular, a means which, during an assembly sequence, undergoes elastic deformation. "Provided" in this context is to be understood as meaning, in particular, specifically equipped and/or designed. A "vertical direction" in this context is to be understood as meaning, in particular, a direction which is perpendicular to a wiping plane. A "wiping plane" is to be understood in this context as meaning, in particular, an idealized plane which is wiped, in an operating state, by a wiper blade fastened on the wiper-blade adapter unit. "Essentially", in this context it is to be understood as meaning, in particular, a deviation of less than 10°.

In a further configuration, it is proposed to provide the latching means so that, during assembly, it is deflected as least essentially parallel to the transverse direction of a basic body of the wiper-blade adapter unit, as a result of which the latching means can absorb particularly large forces. A "transverse direction" in this context is to be understood as meaning, in particular, a direction which is perpendicular to a longitudinal direction, and perpendicular to a vertical direction, and runs parallel to a wiping plane. A "longitudinal direction" in this context is to be understood as meaning, in particular, a direction which extends at least essentially parallel to a main direction of extent of the wiper-blade adapter unit. A "vertical direction" in this context is to be understood as meaning, in particular, a direction which is perpendicular to the wiping plane.

It is also proposed to provide the latching means so that, during assembly, it is deflected essentially parallel to a longitudinal direction of the basic body of the wiper-blade adapter unit, as a result of which the latching means can be operated particularly straightforwardly. A "longitudinal direction" in this context is to be understood as meaning, in particular, a direction which extends essentially parallel to a main direction of extent of the wiper-blade adapter unit.

If the latching means is formed in one piece with the basic body of the wiper-blade adapter unit, the wiper-blade adapter unit and the latching means can be produced in a particularly favorable manner. "In one piece" is to be understood as meaning, in particular, connected integrally, as is the case, for example, as a result of a welding process and/or adhesive-bonding process, etc., and, particularly advantageously, integrally formed, as is the result of monobloc production and/or of production by injection molding using one or more components.

It is further proposed for the latching means to be designed as a barb, this making it possible to establish particularly rapid assembly of the wiper device.

If the latching means is arranged on an enclosure means which belongs to the wiper-blade adapter unit and, in at least one operating state, forms at least a large part of a visible outer surface of the wiper-blade adapter unit, it is advantageously possible for the wiper device to be protected against external influences, for example water. A "large part" in this context is to be understood as meaning, in particular, more than 50%, preferably 70%.

A particularly stable embodiment of the wiper device can be achieved if a basic body of the wiper-blade adapter unit has a fastening pin which, in at least one operating state, establishes a form fit with the fastening aperture of the wiper-arm adapter unit.

If the latching means, in at least one operating state, engages in a fastening aperture of the wiper-arm adapter unit, the latching means can be arranged such that it is accessible to particularly good effect by a user.

BRIEF DESCRIPTION OF THE DRAWINGS

Further advantages can be gathered from the following description of the drawings. The drawings illustrate exemplary embodiments of the invention. The drawings, the description and the claims contain numerous features in combination. A person skilled in the art will expediently also consider the features individually and combine them to give expedient further combinations. For reasons of clarity, the claims do not refer to all the exemplary embodiments. However, it is usually the case that a number of exemplary embodiments are covered by each claim.

In the drawings:

FIGS. 9a to 9c show a perspective view of a further exemplary embodiment of a wiper device during an assembly sequence.

DETAILED DESCRIPTION

Figure 1A:
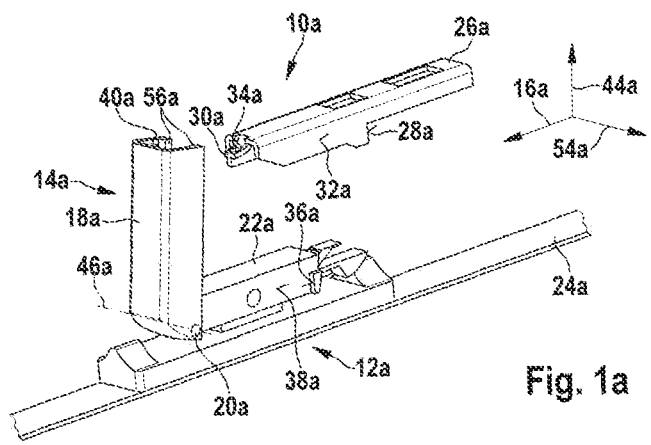
FIGS. 1a to 1c show a perspective view of a wiper device during an assembly sequence.

FIG. 1a shows a wiper device for a motor-vehicle window, having a wiper-arm adapter unit 10a and a wiper-blade adapter unit 12a in an open state. A movably mounted arresting means 14a, which is designed as an enclosure means 18a, is arranged on the wiper-blade adapter unit 12a.

The enclosure means 18a is mounted on a basic body 22a of the wiper-blade adapter unit 12a such that it can be pivoted at a rotary articulation 20a. The basic body 22a connects the wiper-blade adapter unit 12a to a separate wiper blade 24a. However, it is also conceivable, in this context, for the wiper-blade adapter unit 12a to be formed in one piece with the wiper-blade 24a.

The wiper-arm adapter unit 10a is formed in one piece with a wiper arm 26a. However, it is also conceivable, in this context, for the wiper-arm adapter unit 10a to be formed separately from the wiper arm 26a and to be connected thereto via a suitable connecting element.

The wiper-arm adapter unit 10a has two backstops 28a and a fastening nose 30a. The backstops 28a terminate flush with side walls 32a of the wiper-arm adapter unit 10a. The fastening nose 30a is performed as an extension at one end of the wiper-arm adapter unit 10a and has a fastening aperture 34a.

The basic body 22a of the wiper-blade adapter unit 12a has two abutment stops 36a which are connected in one piece on side walls 38a of the basic body 22a.

Two protrusions are arranged as movably mounted latching means 56a on two lateral inner surfaces 40a of the enclosure means 18a, said protrusions being formed in one piece with the inner surfaces 40a. The latching means 56a are designed as barbs and can be moved out of a starting position essentially parallel to a transverse direction 54a of the basic body 22a, and automatically move back again into the starting position.

For assembly with the wiper-blade adapter unit 12a, the wiper-arm adapter unit 10a is lowered onto the basic body 22a in a vertical direction 44a. The backstops 28a here terminate flush with the abutment stops 36a and thus avoid longitudinal movement of the wiper-arm adapter unit 10a relative to the wiper-blade adapter unit 12a, which runs parallel to a longitudinal direction 16a (FIG. 1b).

Figure 1B:
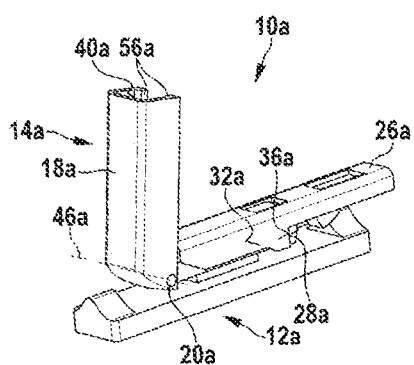

As FIG. 1b also shows, the wiper-arm adapter unit 10a rests in a form-fitting manner on the basic body 22a. Movement of the wiper-arm adapter unit 10a relative to the wiper-blade adapter unit 12a, then, is possible only parallel to the vertical direction 44a. In order to avoid this movement, the enclosure means 18a pivots, by way of the rotary articulation 20a, about a pivot axis 46a, arranged essentially parallel to the transverse direction 54a, and encloses the wiper-arm adapter unit 10a in a form-fitting manner. During assembly, the latching means 56a are deflected essentially parallel to the transverse direction 54a of the wiper-blade adapter unit 12a.

Figure 1C:
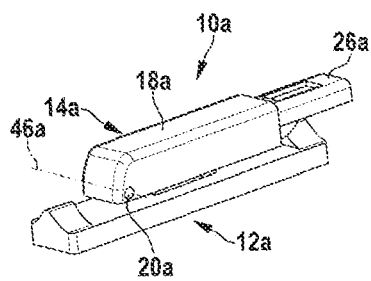

The latching means 56a engage beneath the abutment stops 36a and prevent the enclosure means 18a from pivoting back into the open state. This restricts the freedom of movement of the wiper-arm adapter unit 10a relative to the wiper-blade adapter unit 12a in the vertical direction 44a of the latter, and the wiper-arm adapter unit 10a is thus located in an assembled state (FIG. 1c). In an assembled state, the enclosure means 18a forms at least a large part of the visible outer surface of the lighter-blade adapter unit 12a.

FIGS. 2 to 10 show fourteen further exemplary embodiments of the invention. The following descriptions are restricted essentially to the differences between the exemplary embodiments, and, in respect of like components, features and functions, reference can be made to the description of the first exemplary embodiment. In order to differentiate between the exemplary embodiments, the letter a in the reference signs of the exemplary embodiment in FIG. 1 has been replaced by the letters b to j in the reference signs of the exemplary embodiments of FIGS. 2 to 10. In respect of identically described components, in particular in respect of components with like designations, reference can also be made, in principle, to the drawings and/or the description of the first exemplary embodiment.

Figure 2A:
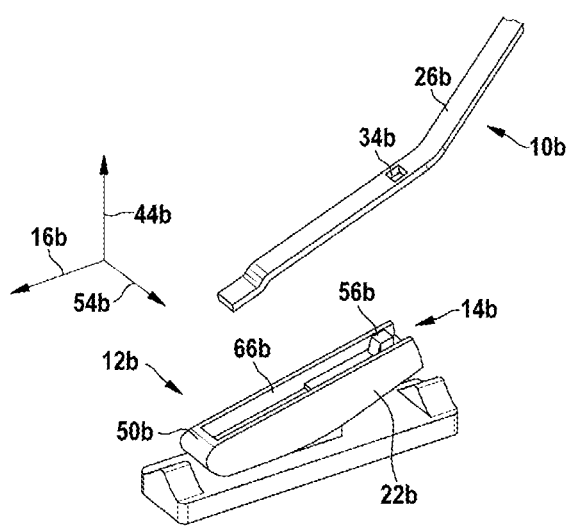
FIGS. 2a to 2c show a perspective view of a further exemplary embodiment of a wiper device during an assembly sequence.

FIG. 2a shows a further exemplary embodiment of a wiper device, having a wiper-arm adapter unit 10b and a wiper-blade adapter unit 12b in an open state. The wiper-arm adapter unit 10b has a fastening aperture 34b arranged in a wiper arm 26b.

The wiper-blade adapter unit 12b has a basic body 22b with a guide rail 66b and an arresting means 14b. The arresting means 14b is designed as a movably mounted latching means 56b which is connected in one piece to the basic body 22b. The latching means 56b is designed as a barb. A protrusion 50b is arranged at one end of the guide rail 66b.

Figure 2B:
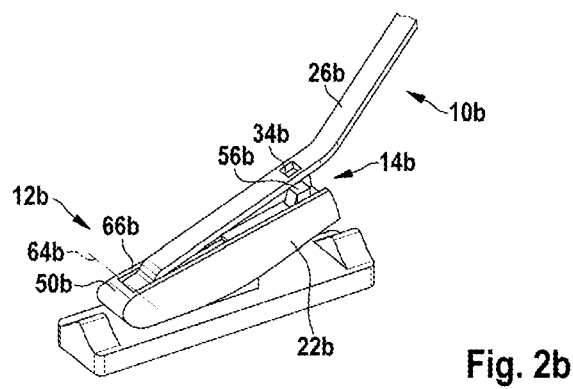
Figure 2C:
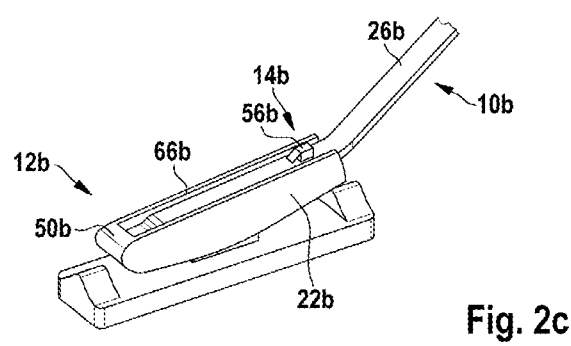

FIG. 2b shows the wiper device in a second assembly step. One end of the wiper-arm adapter unit 10b has been pushed in beneath the protrusion 50b. A rotation of the wiper-arm adapter unit 10b about a transverse axis 64b brings the wiper device into an assembled state (FIG. 2c). The latching means 56b here is deflected by the wiper-arm adapter unit 10b, in the first instance essentially parallel to a longitudinal direction 16b of the basic body 22b of the wiper-blade adapter unit 12b, and then latches into the fastening aperture 34b.

In the assembled state, the freedom of movement of the wiper-arm adapter unit 10b is restricted in a transverse direction 54b. The latching means 56b restricts the wiper-arm adapter unit 10b in a longitudinal direction 16b and in a vertical direction 44b.

Figure 3A:
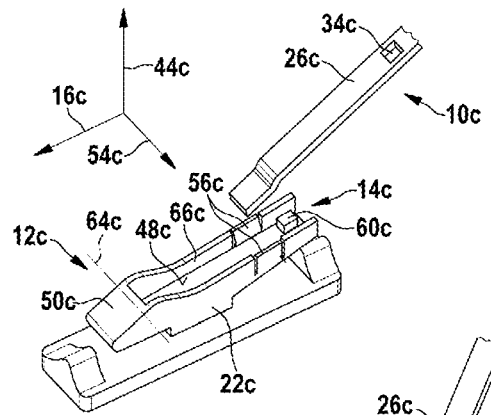
FIGS. 3a to 3c show a perspective view of a further exemplary embodiment of a wiper device during an assembly sequence.

FIG. 3a shows a further exemplary embodiment of a wiper device, having a wiper-arm adapter unit 10c and a wiper-blade adapter unit 12c in an open state. The wiper-arm adapter unit 10c has a fastening aperture 34c arranged in a wiper arm 26c.

The wiper-blade adapter unit 12c has a basic body 22c with a guide rail 66c and an arresting means 14c. The arresting means 14c is designed as a movably mounted latching means 56c which is connected in one piece to the guide rail 66c and is in the form of a barb. A protrusion 50c is arranged at one end of the guide rail 66c.

Figure 3B:
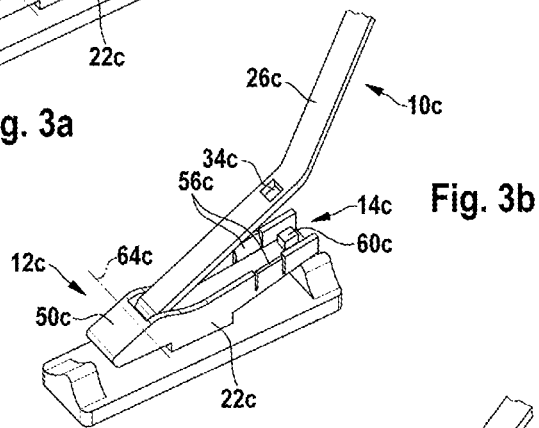
Figure 3C:
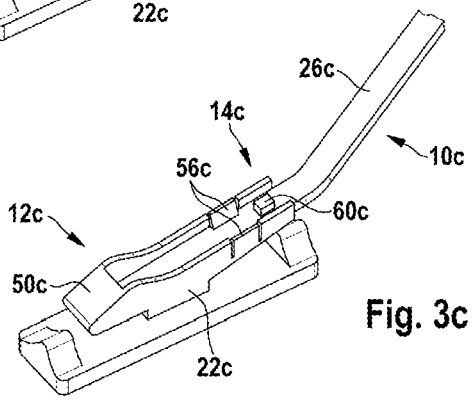

FIG. 3b shows the wiper device in a second assembly step. One end of the wiper-arm adapter unit 10c has been pushed in beneath the protrusion 50c. A rotation of the wiper-arm adapter unit 10c about a transverse axis 64c brings the wiper device into an assembled state (FIG. 3c). The latching means 56c here is deflected by the wiper-arm adapter unit 10c, in the first instance essentially parallel to a transverse direction 54c, and then latches in over the wiper-arm 26c. The fastening aperture 34c terminates flush with a fastening pine 60c, which is arranged on a bearing surface 48c of the basic body 22c.

In the assembled state, the freedom of movement of the wiper-arm adapter unit 10c is restricted in the transverse direction 54c. The latching means 56c restricts the wiper-arm adapter unit 10c exclusively in a vertical direction 44c. Movement of the wiper-arm adapter unit 10c in the longitudinal direction 16c is avoided by a form fit between the fastening aperture 34c and the fastening pin 60c.

Figure 4A:
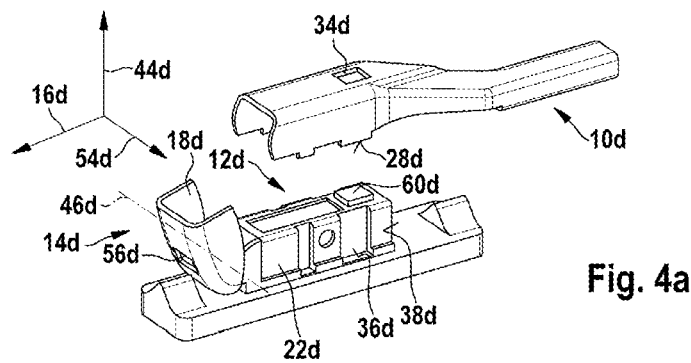
FIGS. 4a to 4c show a perspective view of a further exemplary embodiment of a wiper device during an assembly sequence.

FIG. 4a shows a further exemplary embodiment of a wiper device, having a wiper-arm adapter unit 10d and a wiper-blade adapter unit 12d in an open state. The wiper-arm adapter unit 10d has a fastening aperture 34d and a backstop 28d.

The wiper-blade adapter unit 12d has an arresting means 14d, which is formed by an enclosure means 18d and is mounted such that it can be pivoted about a pivot axis 46d. The pivot axis 46d is arranged essentially parallel to a transverse direction 54d.

The wiper-blade adapter unit 12d further comprises a basic body 22d with a fastening pin 60d, which has an essentially square cross section. An abutment stop 36d is arranged on a side wall 38d of the basic body 22d.

Figure 4B:
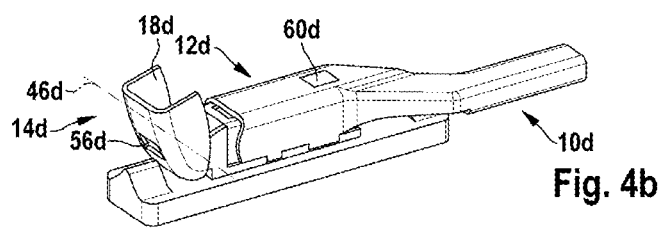

FIG. 4b shows the wiper device in a second assembly step. The wiper-arm adapter unit 10d rests on the basic body 22d of the wiper-blade adapter unit 12d. The fastening aperture 34d establishes a form fit with the fastening pin 60d and thus avoids movement of the wiper-arm adapter unit 10d relative to the wiper-blade adapter unit 12d parallel to a longitudinal direction 16d, and parallel to the transverse direction 54d. In addition, freedom of movement in the longitudinal direction 16d is avoided by a form fit between the abutment stop 36d and the backstop 28d.

In order to avoid movement of the wiper-arm adapter unit 10d in a vertical direction 44d of the basic body 22d, the arresting means 14d is pivoted about the pivot axis 46d. Part of the enclosure means 18d here engages over the wiper-blade adapter unit 12d and restricts the freedom of movement of the latter in the vertical direction 44d.

Figure 4C:
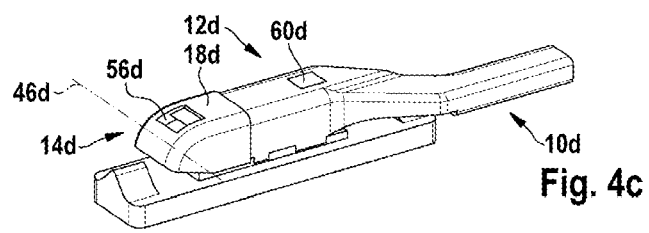

FIG. 4c shows the wiper device in an assembled state. Pivoting of the enclosure means 18d back into the open state is avoided by a movably mounted latching means 56d which is arranged in an aperture of the enclosure means 18d. The latching means 56d is designed as a barb and latches to the basic body 22d in a manner with which a person skilled in the art is familiar.

Figure 5A:
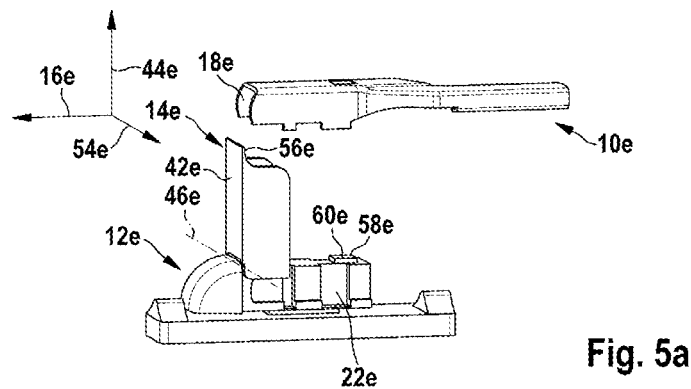
FIGS. 5a to 5c show a perspective view of a further exemplary embodiment of a wiper device during an assembly sequence.

FIG. 5a shows a further exemplary embodiment of the wiper device from FIGS. 2a-c, having an enclosure means 18e arranged in a pivotably mounted manner on the wiper-blade adapter unit 12e. A securing means 42e, which is designed as latching means 56e and is in the form of a barb, is arranged on the enclosure means 18e.

Figure 5B:
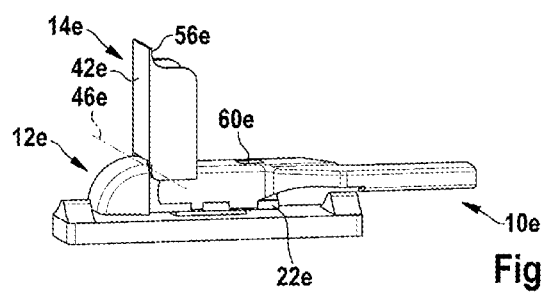

FIG. 5b shows the wiper device in a second assembly step. The enclosure means 18e forms a lateral guide for the wiper-arm adapter unit 10e.

Figure 5C:
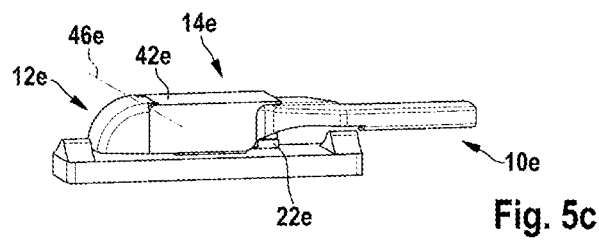

FIG. 5c shows the wiper device in an assembled state. The enclosure means 18e has been pivoted onto the wiper-arm adapter unit 10e and establishes a form fit therewith. The securing means 42e latches into an aperture 58e of the basic body 22e of the wiper-blade adapter unit 12e. The aperture 58e is arranged in the fastening pin 60e of the basic body 22e. Pivoting of the enclosure means 18e back into the open state is thus avoided.

Figure 6A:
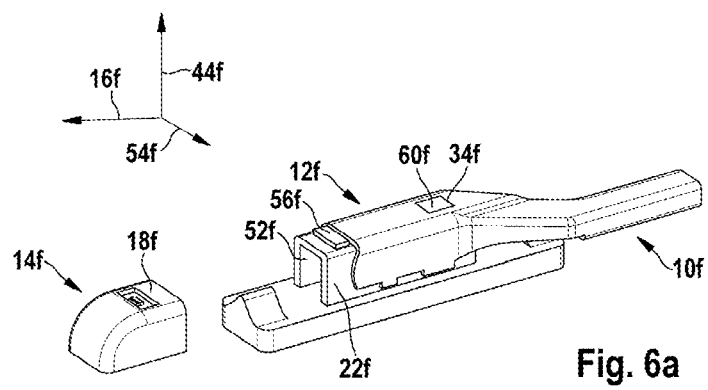
FIGS. 6a and 6b show a perspective view of a further exemplary embodiment of a wiper device during an assembly sequence.

FIG. 6a shows a further exemplary embodiment of a wiper device, having a wiper-arm adapter unit 10f and a wiper-blade adapter unit 12f in an open state. The wiper-arm adapter unit 10f has a fastening aperture 34f.

The wiper-blade adapter unit 12f has an arresting means 14f, which is mounted in a freely movable manner and is formed by an enclosure means 18f. The wiper-blade adapter unit 12f also has a basic body 22f with a fastening pin 60f, which has an essentially square cross section.

The fastening aperture 34f establishes a form fit with the fastening pin 60f and thus avoids movement of the wiper-arm adapter unit 10f in a longitudinal direction 16f and the transverse direction 54f. Movement of the wiper-arm adapter unit 10f is possible only in a vertical direction 44f.

Figure 6B:
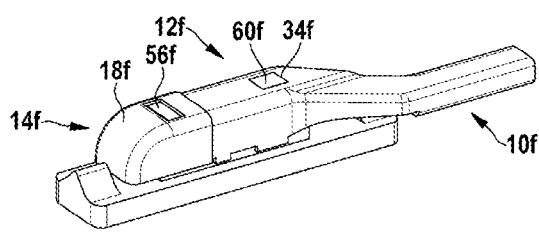

FIG. 6b shows the wiper device in an assembled state. The enclosure means 18f has been pushed over the wiper-arm adapter unit 10f and, in the process, latches into two recesses 52f arranged in the basic body 22f. The situation where the enclosure means 18f is pushed back is avoided by a latching means 56f arranged on the basic body 22f. The latching means 56f is designed as a barb and engages in an aperture of the enclosure means 18f.

Figure 7A:
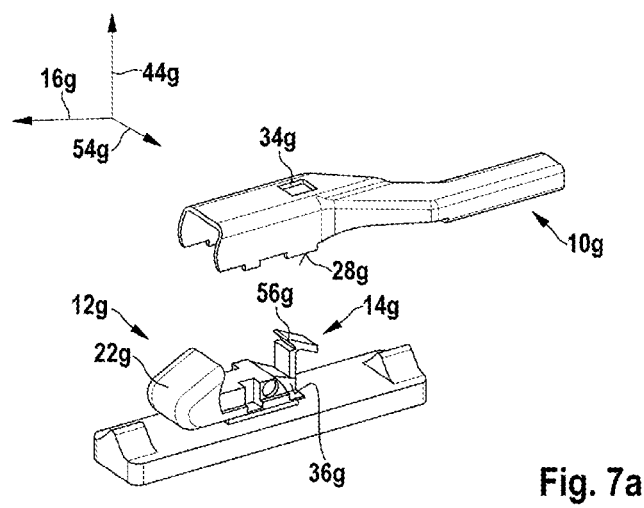
FIGS. 7a and 7b show a perspective view of a further exemplary embodiment of a wiper device during an assembly sequence.

FIG. 7a shows the further exemplary embodiment of a wiper device, having a wiper-arm adapter unit 10g and a wiper-blade adapter unit 12g in an open state. The wiper-arm adapter unit 10g has a fastening aperture 34g and a backstop 28g.

The wiper-blade adapter unit 12g has a basic body 22g with an arresting means 14g. The arresting means 14g is designed as a movably mounted latching means 56g, connected in one piece to the basic body 22g, and is in the form of a barb. The basic body 22g has an abutment stop 36g. During an assembly operation, the latching means 56g is deflected essentially parallel to a longitudinal direction 16g of the basic body 22g of the wiper-blade adapter unit 12g.

Figure 7B:
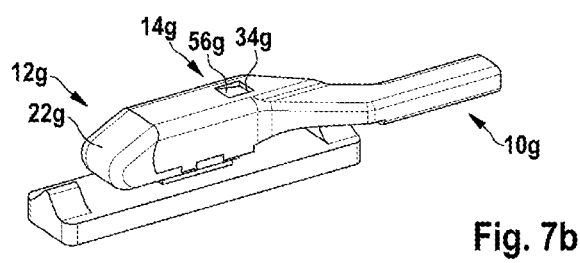

FIG. 7b shows the wiper device in an assembled state. The wiper-arm adapter unit 10g establishes a form fit with the basic body 22g. Movement of the wiper-arm adapter unit 10g in a transverse direction 54g is thus avoided. The abutment stop 36g of the basic body 22g adjoins the backstop 28g of the wiper-arm adapter unit 10 in a flush manner and thus avoids movement of the wiper-arm adapter unit 10g in the longitudinal direction 16g.

The latching means 56g latches into the fastening aperture 34g of the wiper-arm adapter unit 10g. This restricts freedom of movement of the wiper-arm adapter unit 10g in a vertical direction 44g.

Figure 8B:
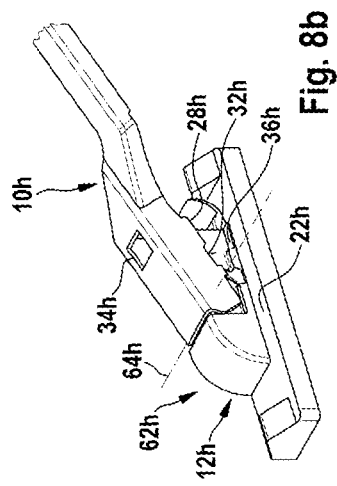
FIGS. 8a to 8c show a perspective view of a further exemplary embodiment of a wiper device during an assembly sequence.
Figure 8C:
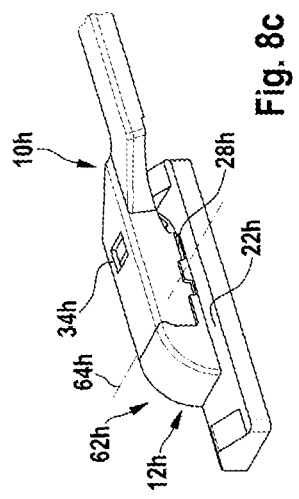
Figure 8A:
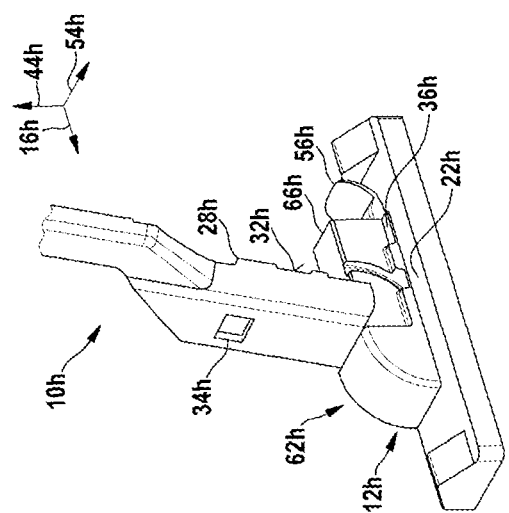

FIG. 8a shows a further exemplary embodiment of a wiper device, having a wiper-arm adapter unit 10h and a wiper-blade adapter unit 10h in an open state. The wiper-arm adapter unit 10h has a fastening aperture 34h and a backstop 28h.

The wiper-blade adapter unit 12h has a basic body 22h with an abutment stop 36h and a movably mounted latching means 56h, which his designed as a barb. The basic body 22h has a curved guide rail 66h, which allows the wiper-arm adapter unit 10h to be accommodated for rotary movement.

FIG. 8b shows the wiper device in a second assembly step. Side walls 32h of the wiper-arm adapter unit 10h engage part of the way around the basic body 22h of the wiper-blade adapter unit 12h and thus avoid movement of the wiper-arm adapter unit 10h relative to the wiper-blade adapter unit 12h in a transverse direction 54h. The wiper-arm adapter unit 10h is rotated relative to the basic body 22h of the wiper-blade adapter unit 12h about a transverse axis 64h, which is arranged essentially parallel to the transverse direction 54h.

FIG. 8c shows the wiper device in an assembled state. In a front region 62h, the wiper-arm adapter unit 10h establishes a form fit with the wiper-blade adapter unit 12h, and this form fit avoids movement of the wiper-arm adapter unit 10h relative to the wiper-blade adapter unit 12h in a vertical direction 44h. The latching means 56h restricts movement of the wiper-arm adapter unit 10h relative to the wiper-blade adapter unit 12h essentially in the vertical direction 44h and thus avoids pivoting of the wiper-arm adapter unit 10h back into the open state.

FIG. 9a shows a further exemplary embodiment of a wiper device, having a wiper-arm adapter unit 10i and a wiper-blade adapter unit 12i in an open state. The wiper-arm adapter unit 10i has a fastening aperture 34i and a backstop 28i.

The wiper-blade adapter unit 12i has a basic body 22i with an arresting means 14i. The arresting means 14i is designed as a movably mounted latching means 56i connected in one piece to the basic body 22i. The basic body 22i also has an abutment stop 36i.

FIG. 9b shows the wiper device in a second assembly step. In a front region 62i, the wiper-arm adapter unit 10i abuts against the wiper-blade adapter unit 12i. A rotary movement of the wiper-arm adapter unit 10i about a transverse axis 64i, which extends essentially parallel to a transverse direction 54i of the basic body 22i, deflects the latching means 56i in a longitudinal direction 16i.

FIG. 9c shows the wiper device in an assembled state. The wiper-arm adapter unit 10i establishes a form fit with the basic body 22i. Movement of the wiper-arm adapter unit 10i in a transverse direction 54i is thus avoided. The abutment stop 36i of the basic body 22i adjoins the backstop 28i of the wiper-arm adapter unit 10i in a flush manner and thus avoids movement of the wiper-arm adapter unit 10i relative to the wiper-blade adapter unit 10i in the longitudinal direction 16i.

The latching means 56i is designed as a barb and latches into the fastening aperture 34i of the wiper-arm adapter unit 10i. This restricts freedom of movement of the wiper-arm adapter unit 10i in a vertical direction 44i.

Figure 10A:
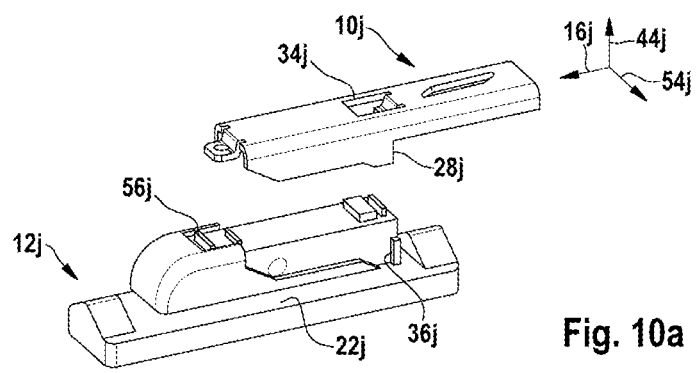
FIGS. 10a to 10b show a perspective view of a further exemplary embodiment of a wiper device during an assembly sequence.

FIG. 10a shows a further exemplary embodiment of a wiper device, having a wiper-arm adapter unit 10j and a wiper-blade adapter unit 12j in an open state. The wiper-arm adapter unit 10j corresponds essentially to the wiper-arm adapter unit 10a from the first exemplary embodiment.

The wiper-blade adapter unit 12j has a basic body 22j with an abutment stop 36j, which extends in a vertical direction 44j, and a movably mounted latching means 56j. The wiper-arm adapter unit 10j is positioned on the basic body 22j of the wiper-blade adapter unit 12j in a linear movement which runs parallel to the vertical direction 44j.

Figure 10B:
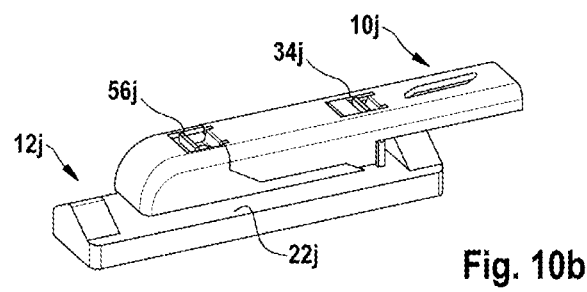

FIG. 10b shows the wiper device in an assembled state. The abutment stop 36j of the basic body 22j terminates flush with a backstop 28j of the wiper-arm adapter unit 10j. The latching means 56j is designed as a barb and engages in a fastening aperture 34j of the wiper-arm adapter unit 10j, and thus avoids movement of the wiper-arm adapter unit 10j relative to the wiper-blade adapter unit 12j in the vertical direction 44j.

What is claimed is:

1. A wiper device for a motor-vehicle window, having a wiper-arm adapter unit (10a, 10j) and a wiper-blade adapter unit (12a-12j) coupled in an assembled state, which, in the assembled state, establish a form fit, characterized by at least one movably mounted latching means (56a-56j) which, in the assembled state, restricts freedom of movement of the wiper-arm adapter unit (10a-10j) at least essentially in a vertical direction (44a-44j) of the wiper-blade adapter unit (12a-12j), wherein the latching means (56a; 56d-56f) is arranged on an enclosure (18a; 18d-18f) of the wiper-blade adapter unit (12a; 12d-12f), wherein the latching means (56a), during assembly, is deflected at least essentially parallel to a transverse direction (54a; 54c) of a basic body (22a; 22c) of the wiper-blade adapter unit (12a; 12c) the enclosure (18a; 18d-f) including a pivot point (20a) about which the enclosure (18a; 18d-f) pivots, wherein the wiper blade adapter unit (12a) includes the basic body (22a) having a laterally protruding abutment stop (36a) with a first surface that faces toward the pivot point (20a) and wherein the wiper-arm adapter unit (10a) includes a backstop (28a) with a second surface that faces and contacts the first surface in the assembled state, wherein the latching means (56a), in the assembled state, engages beneath and with a lower surface the abutment stop (36a).

2. The wiper device as claimed in claim 1, characterized in that the latching means (56a-56j) is a barb.

3. The wiper device as claimed in claim 1, wherein in the assembled state, the enclosure (56a, 56d, 56f) forms at least a large part of a visible outer surface of the wiper-blade adapter unit (12a; 12d-12f).

4. The wiper device as claimed in claim 1, wherein the wiper-arm adapter unit (10a) is configured to be lowered vertically onto the basic body (22a) until the first surface is in contact with the second surface.

5. The wiper device as claimed in claim 1, wherein the wiper-arm adapter unit (10a) includes a fastening nose (30a) having a fastening aperture (34a).

6. The wiper device as claimed in claim 1, wherein the abutment stop (36a) includes a projection that extends laterally outwardly from a wall (38a) of the basic body (22).

7. The wiper device as claimed in claim 1, wherein the wiper arm adapter unit (10a, 10j) includes a vertically extending sidewall (32a), and wherein the backstop (28a) is part of the sidewall (32a).

8. The wiper device as claimed in claim 1, wherein the wiper arm adapter unit (10a, 10j) is configured to be moved vertically down over the basic body (22a).

9. The wiper device as claimed in claim 1, wherein the wiper arm adapter unit (10a, 10j) is configured to be moved vertically down over the basic body (22a) without any lateral deflection of the wiper arm adapter unit (10a, 10j).

* * * * *